United States Patent
Nomura

(10) Patent No.: US 12,495,951 B2
(45) Date of Patent: Dec. 16, 2025

(54) ENDOSCOPE SYSTEM AND OPERATION METHOD OF THE SAME

(71) Applicant: FUJIFILM Corporation, Tokyo (JP)

(72) Inventor: Kazuya Nomura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 489 days.

(21) Appl. No.: 18/185,729

(22) Filed: Mar. 17, 2023

(65) Prior Publication Data

US 2023/0301489 A1    Sep. 28, 2023

(30) Foreign Application Priority Data

Mar. 22, 2022    (JP) ................................. 2022-045278

(51) Int. Cl.
 *A61B 1/00*    (2006.01)
 *A61B 1/045*    (2006.01)

(52) U.S. Cl.
 CPC .......... *A61B 1/00009* (2013.01); *A61B 1/045* (2013.01); *A61B 1/00059* (2013.01)

(58) Field of Classification Search
 CPC ... A61B 1/00009; A61B 1/045; A61B 1/0059; A61B 1/07; A61B 1/00006; A61B 1/0655
 See application file for complete search history.

(56) References Cited

U.S. PATENT DOCUMENTS

| | | | | |
|---|---|---|---|---|
| 2002/0032380 A1* | 3/2002 | Acker | ..................... | A61B 5/283 600/439 |
| 2005/0203343 A1* | 9/2005 | Kang | ................... | A61B 5/0084 600/178 |
| 2006/0128337 A1* | 6/2006 | Fujita | .................. | A61B 1/00057 455/140 |
| 2007/0223797 A1* | 9/2007 | Kaneko | .............. | A61B 1/00009 382/128 |
| 2008/0306338 A1* | 12/2008 | Yamazaki | .............. | H04N 23/10 600/109 |
| 2014/0139145 A1* | 5/2014 | Shimada | .............. | A61B 1/0669 315/360 |
| 2019/0000304 A1 | 1/2019 | Tomii et al. | | |

(Continued)

FOREIGN PATENT DOCUMENTS

| | | |
|---|---|---|
| JP | 2005-287062 A | 10/2005 |
| JP | WO2017/183387 A1 | 4/2018 |
| WO | 2021/117330 A1 | 6/2021 |

OTHER PUBLICATIONS

An Office Action; "Notice of Reasons for Refusal," mailed by the Japanese Patent Office on Aug. 12, 2025, which corresponds to Japanese Patent Application No. 2022-045278 and is related to U.S. Appl. No. 18/185,729; with English language translation.

*Primary Examiner* — Anh Tuan T Nguyen
*Assistant Examiner* — Jae Woo
(74) *Attorney, Agent, or Firm* — Studebaker Brackett PLLC

(57) ABSTRACT

A scope logic circuit outputs, to a processor device, a synchronization signal and a frame signal which is output from the image pickup sensor through image pickup of an object to be observed, in a case where the image pickup drive method is not changed. The scope logic circuit outputs, to the processor device, a synchronization signal and a dummy signal which is a signal different from the frame signal and which is artificially generated, in a case where the image pickup drive method is changed in response to a sensor switching request.

12 Claims, 12 Drawing Sheets

(56) References Cited

U.S. PATENT DOCUMENTS

| | | | |
|---|---|---|---|
| 2019/0373197 A1* | 12/2019 | Harada | A61B 1/00009 |
| 2021/0177241 A1* | 6/2021 | Tanaka | A61B 1/00013 |
| 2021/0368373 A1* | 11/2021 | Youn | H04W 76/16 |
| 2022/0257097 A1* | 8/2022 | Shimomura | A61B 1/0638 |

* cited by examiner

FIG. 14
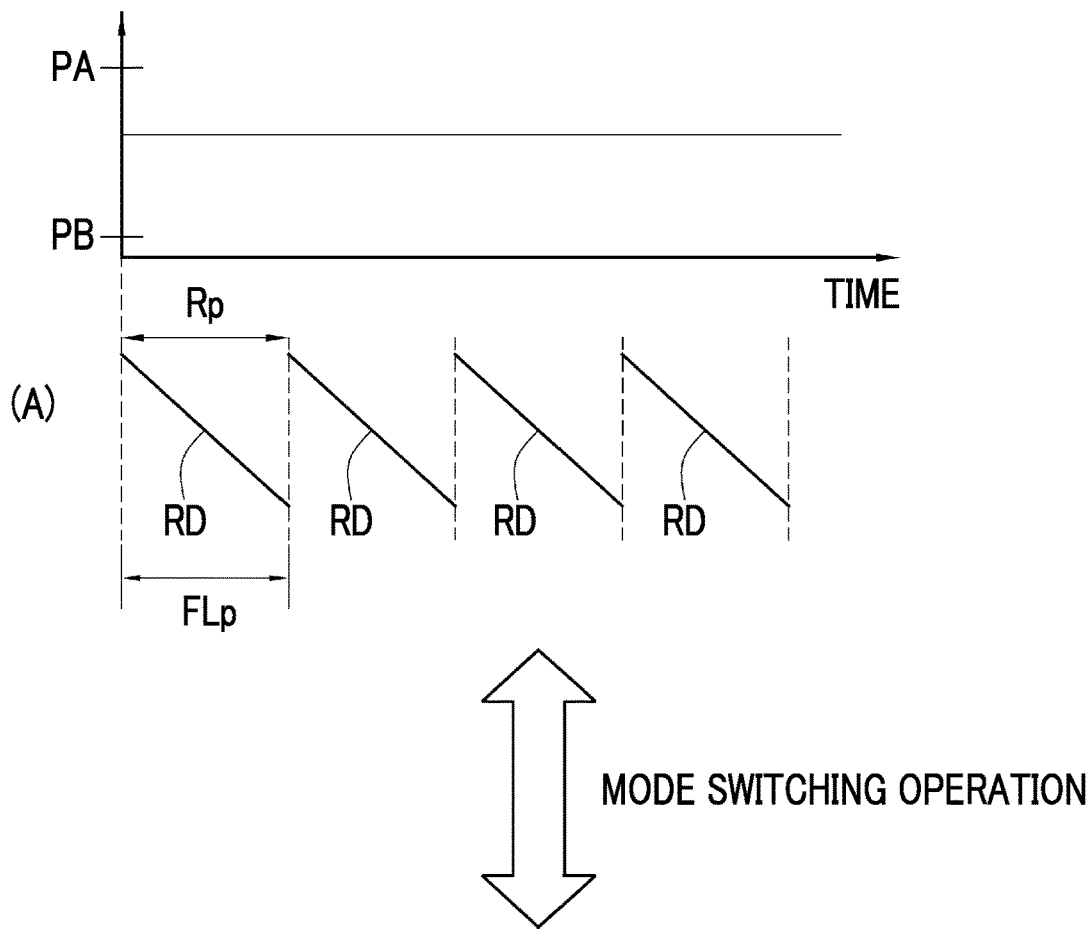
MODE SWITCHING OPERATION
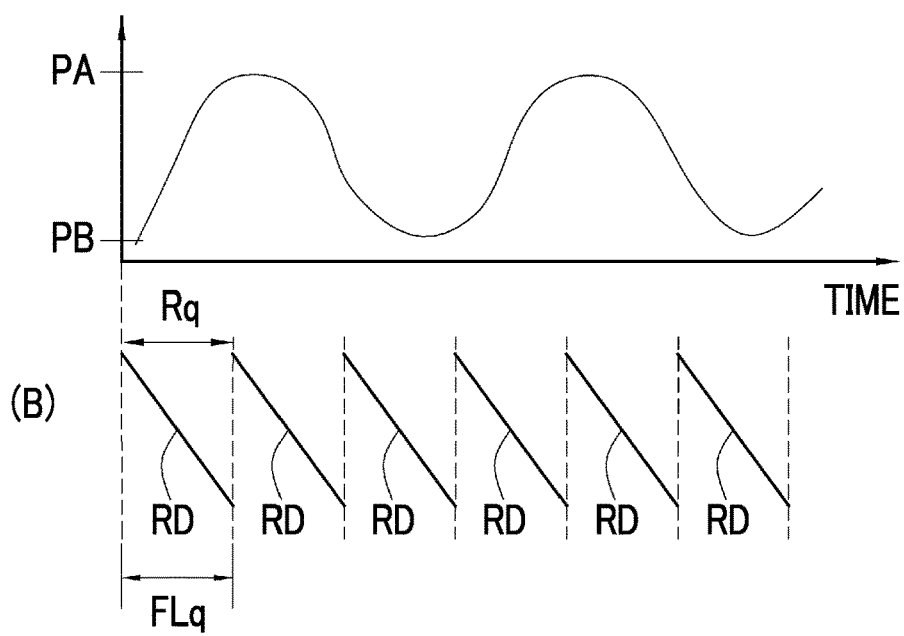

ENDOSCOPE SYSTEM AND OPERATION METHOD OF THE SAME

CROSS-REFERENCE TO RELATED APPLICATIONS

This application claims priority under 35 U.S.C § 119(a) to Japanese Patent Application No. 2022-045278 filed on 22 Mar. 2022. The above application is hereby expressly incorporated by reference, in its entirety, into the present application.

BACKGROUND OF THE INVENTION

1. Field of the Invention

The present invention relates to an endoscope system having a plurality of image pickup drive methods and an operation method of the same.

2. Description of the Related Art

In the field of an endoscope, image pickup has been performed by using a plurality of types of illumination light, such as normal light or special light, to illuminate an object to be observed. For example, in WO2021/117330A (corresponding to US2022/257097A1), in a case where an object to be observed is continuously irradiated with normal light in a first period and then the object to be observed is irradiated with special light in a second period, a frame rate of an image pickup unit that performs image pickup on the basis of each irradiation is set to be higher than a frame rate of a display unit that displays an image obtained by the image pickup. With this, in WO2021/117330A, a high-quality live image based on the image pickup with normal light is displayed while the image pickup with special light is performed.

SUMMARY OF THE INVENTION

As disclosed in WO2021/117330A, in an endoscope system, two types of image pickup control, that is, normal frame rate image pickup in which the frame rate of the image pickup unit and the frame rate of the display unit are the same and high frame rate image pickup in which the frame rate of the image pickup unit is set to be higher than the frame rate of the display unit, have been performed. For example, in a case of switching from the normal frame rate image pickup to the high frame rate image pickup, it is necessary for an image pickup sensor to be temporarily on standby in order to change an image pickup drive method, such as a frame rate. In this case, in addition to a frame signal obtained by the image pickup, the image pickup sensor also temporarily stops the generation of a synchronization signal generated together with the frame signal.

Meanwhile, in the endoscope system, light emission control, signal processing, display control, and the like are performed on the basis of the synchronization signal, and an abnormality detection function of detecting whether or not an abnormality has occurred in the control or the processing, on the basis of the synchronization signal, is provided. Therefore, as described above, since the generation of the synchronization signal is stopped when the image pickup drive method is changed, it is conceivable that the abnormality detection function is disabled. However, with regard to the disabling of the abnormality detection function, since not only the disabling but also the processing of enabling after the setting of the image pickup drive method is completed is required, a time for switching between the disabling and the enabling of the abnormality detection function increases, and, as a result, the system becomes complicated. In addition, in a case of stopping a video of the image pickup sensor and resuming the video for each processing unit in a method other than the synchronization signal when changing the image pickup drive method, the system is also complicated.

An object of the present invention is to provide an endoscope system and an operation method of the same in which an image pickup drive method of an image pickup sensor is changed without complicating the system.

According to the present invention, there is provided an endoscope system comprising: an endoscope having an image pickup sensor and a scope processor; and a processor device having a system processor, in which the system processor is configured to make a sensor switching request for changing an image pickup drive method of the image pickup sensor to the scope processor, and any of the scope processor or the system processor is configured to output, to the processor device, a synchronization signal and a frame signal which is output from the image pickup sensor through image pickup of an object to be observed, in a case where the image pickup drive method is not changed, and to output, to the processor device, a synchronization signal and a dummy signal which is a signal different from the frame signal and which is artificially generated, in a case where the image pickup drive method is changed in response to the sensor switching request.

It is preferable that a dummy signal identifier is assigned to the dummy signal. It is preferable that any of the scope processor or the system processor is configured to identify the frame signal before switching of the image pickup drive method or as the frame signal after the switching of the image pickup drive method, in a case where there is no dummy signal identifier, and identify the dummy signal during the switching of the image pickup drive method, in a case where there is the dummy signal identifier.

It is preferable that the system processor is configured to stop updating a video displayed on a display, at a time at which the dummy signal is identified. It is preferable that the system processor is configured to set an image processing parameter to be used after changing the image pickup drive method, at a time at which identification is made as the dummy signal. It is preferable that the system processor is configured to temporarily switch a light source control algorithm to a light source control algorithm during dummy signal identification, at a time at which the dummy signal is identified. It is preferable that the algorithm during dummy signal identification includes generating light source control information used for calculating a target light amount, on the basis of a frame signal immediately before the dummy signal is identified.

It is preferable that the system processor is configured to execute a light source control algorithm on the basis of a frame signal obtained after the frame signal is identified, at a time at which the frame signal is identified after the dummy signal is identified. It is preferable that the system processor is configured to resume updating a video on a display, on the basis of a frame signal obtained after the frame signal is identified, at a time at which the frame signal is identified after the dummy signal is identified.

It is preferable that the dummy signal includes a dummy identification image. It is preferable that the system processor performs an abnormality detection function on the basis of the synchronization signal.

According to the present invention, there is provided an operation method of an endoscope system that includes an endoscope, which has an image pickup sensor and a scope processor, and a processor device, which has a system processor, the operation method comprising: a step of causing the system processor to make a sensor switching request for changing an image pickup drive method of the image pickup sensor to the scope processor; and a step of causing any of the scope processor or the system processor to output, to the processor device, a synchronization signal and a frame signal which is output from the image pickup sensor through image pickup of an object to be observed, in a case where the image pickup drive method is not changed, and to output, to the processor device, a synchronization signal and a dummy signal which is a signal different from the frame signal and which is artificially generated, in a case where the image pickup drive method is changed in response to the sensor switching request.

According to the present invention, it is possible to change the image pickup drive method of the image pickup sensor without complicating the system.

Figure 5:
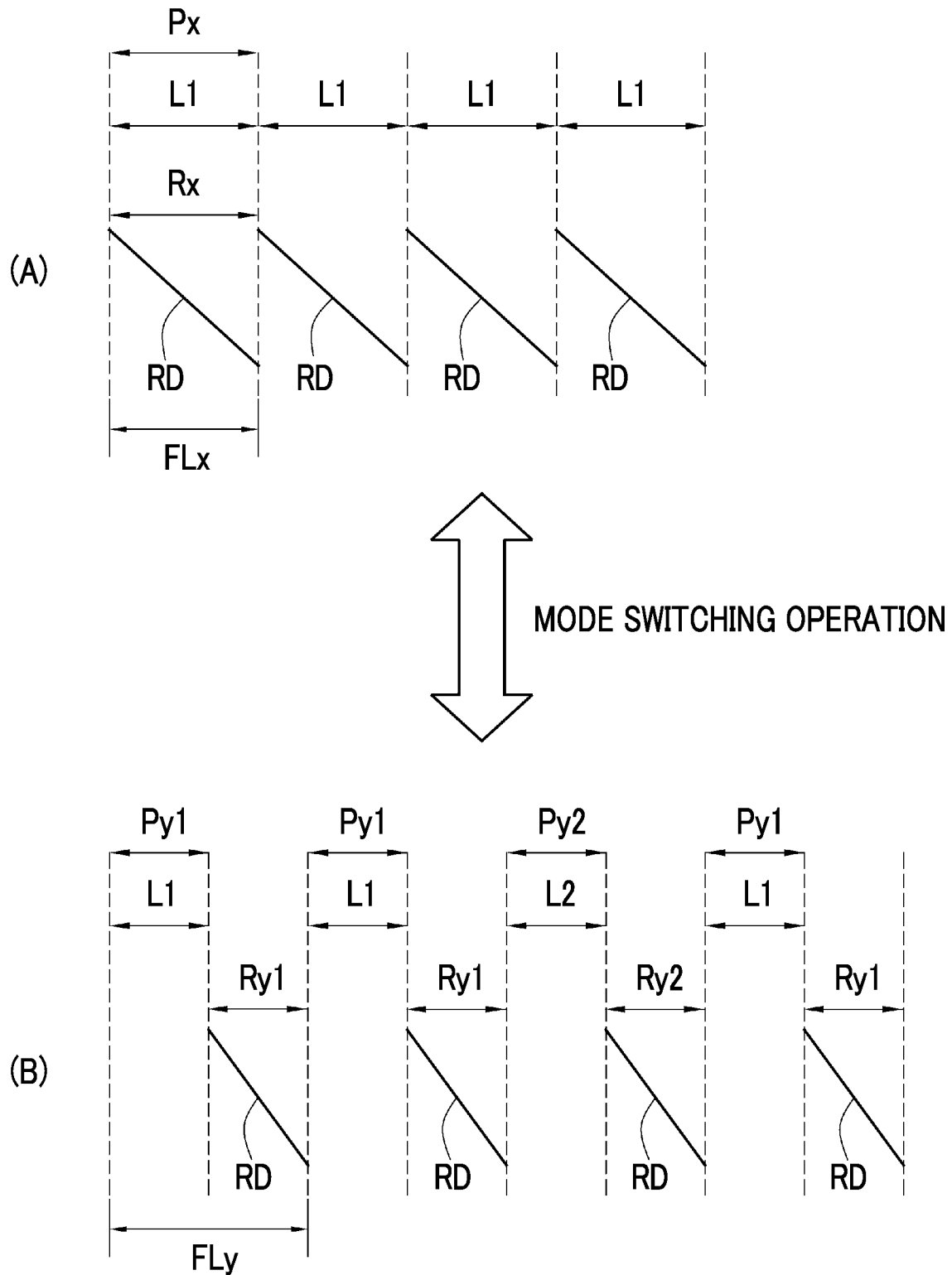

(A) of FIG. 5 is a diagram illustrating light emission control and image pickup control in a mono-light emission mode, and (B) of FIG. 5 is a diagram illustrating light emission control and image pickup control in the multi-light emission mode.

Figure 6:
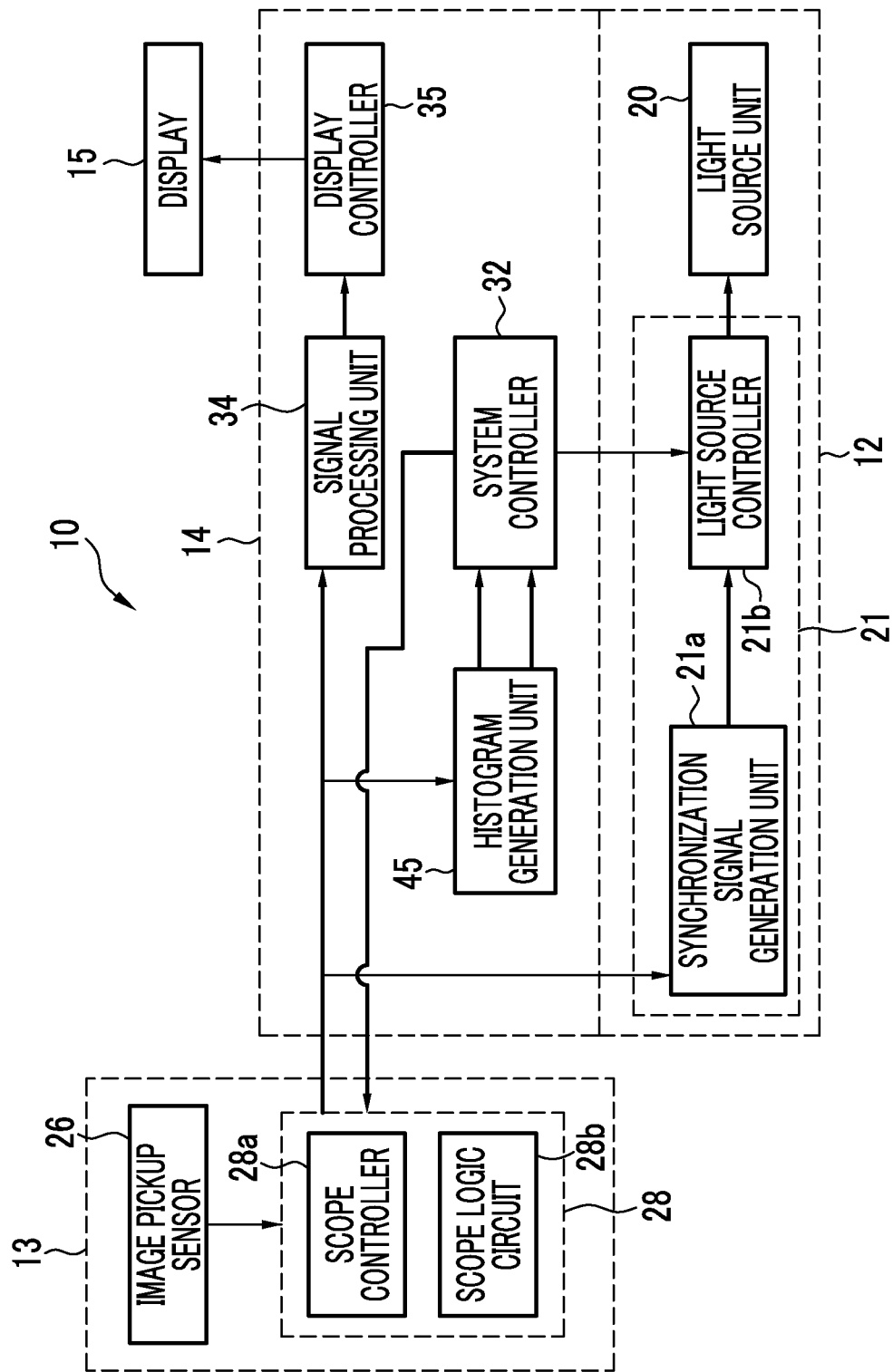

FIG. 6 is a block diagram showing a function of the endoscope system used for illustrating various types of processing when an image pickup drive method is changed.

Figure 7:
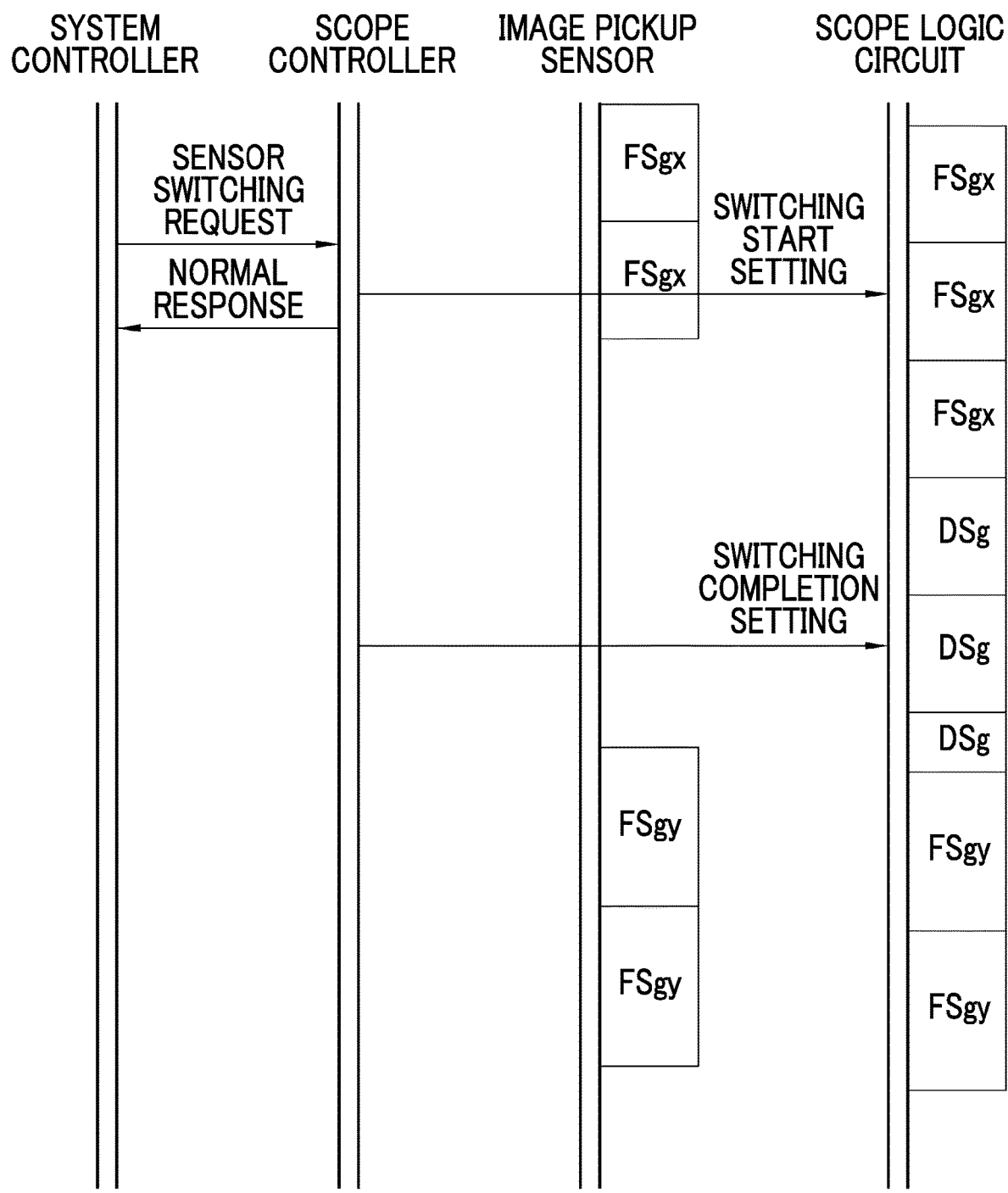

FIG. 7 is a diagram illustrating control for an endoscope and for a processor device in a case of switching from the mono-light emission mode to the multi-light emission mode.

Figure 8:
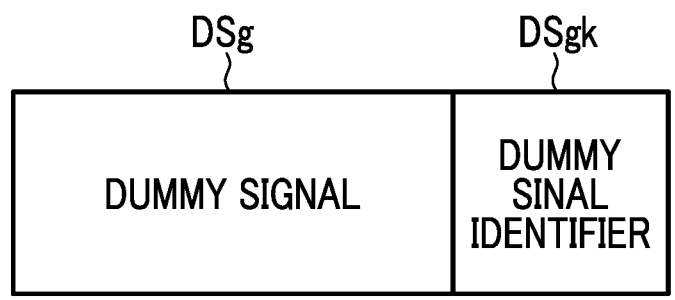

FIG. 8 is a diagram illustrating a dummy signal to which a dummy signal identifier is assigned.

Figure 9:
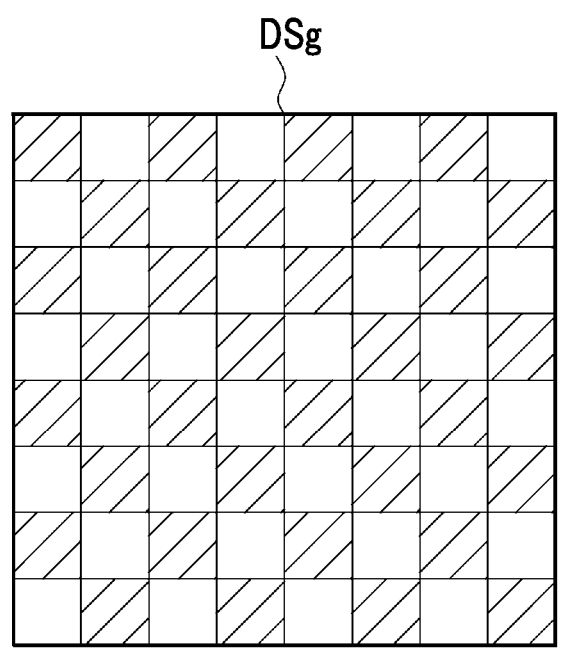

FIG. 9 is a diagram illustrating a dummy signal including a dummy identification image.

Figure 10:
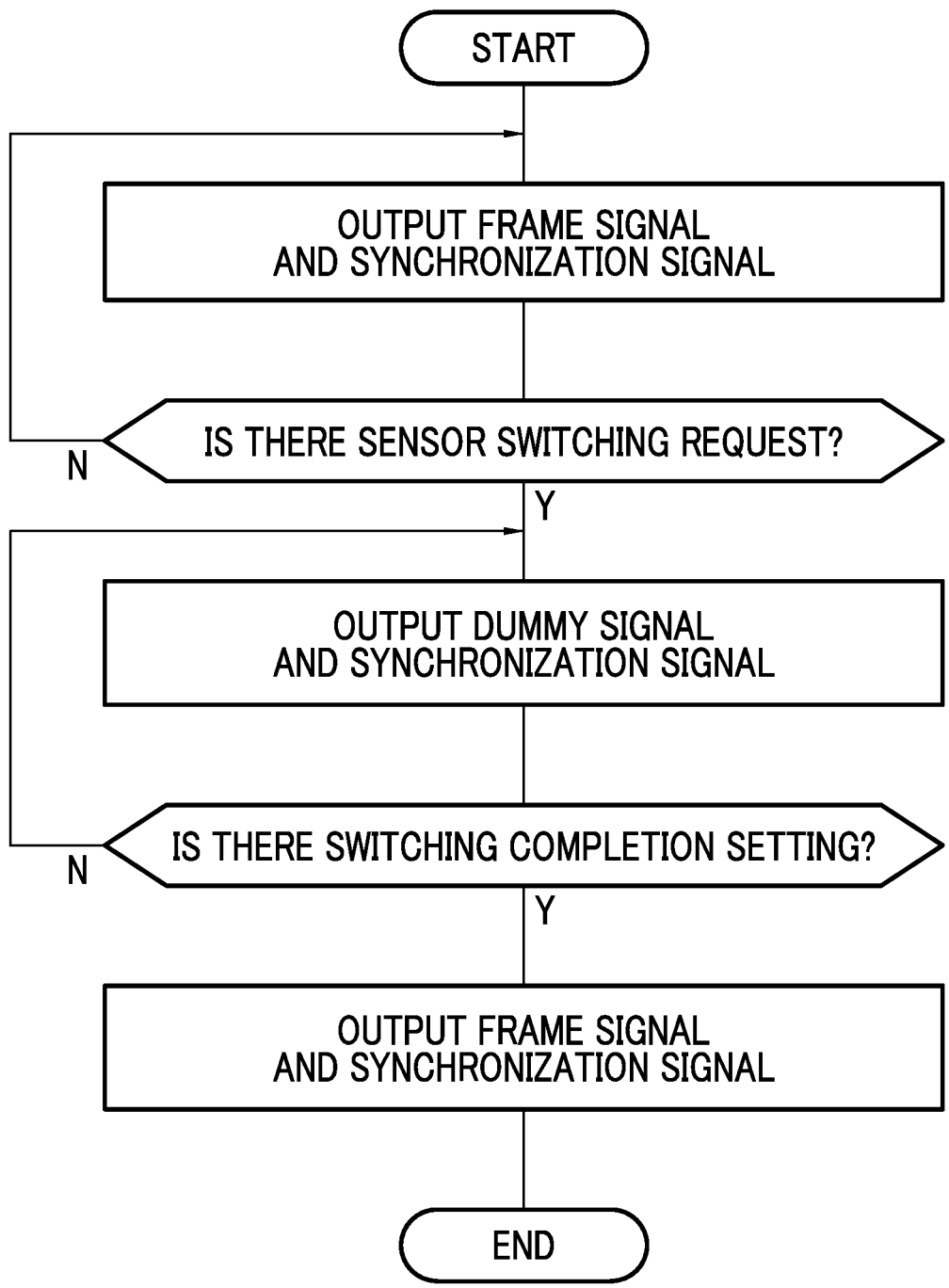

FIG. 10 is a flowchart showing a series of flows of changing the image pickup drive method of the image pickup sensor.

Figure 11:
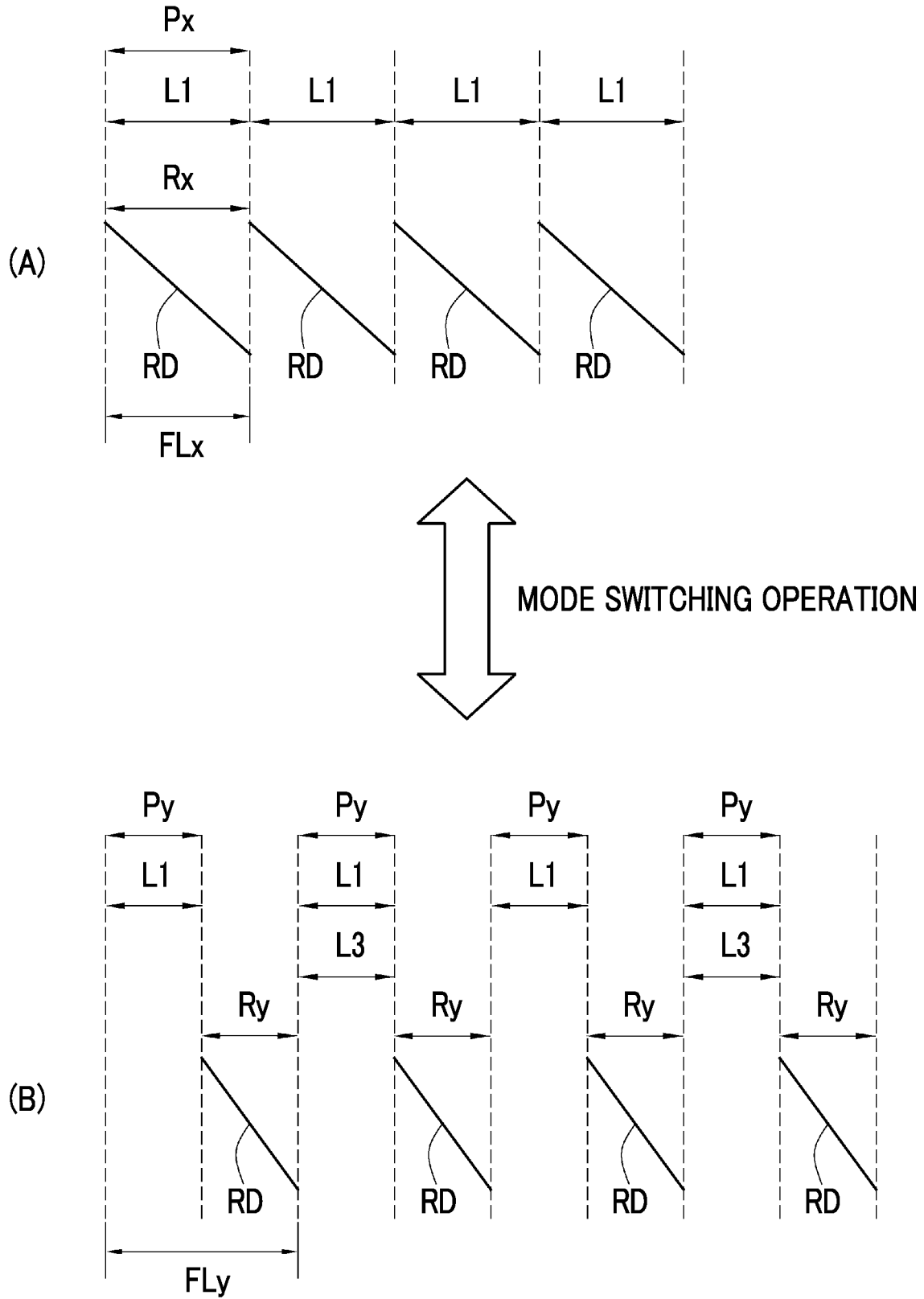

(A) of FIG. 11 is a diagram illustrating the light emission control and the image pickup control in the mono-light emission mode, and (B) of FIG. 11 is a diagram illustrating light emission control and image pickup control in a multi-color intermittent light emission mode.

Figure 12:
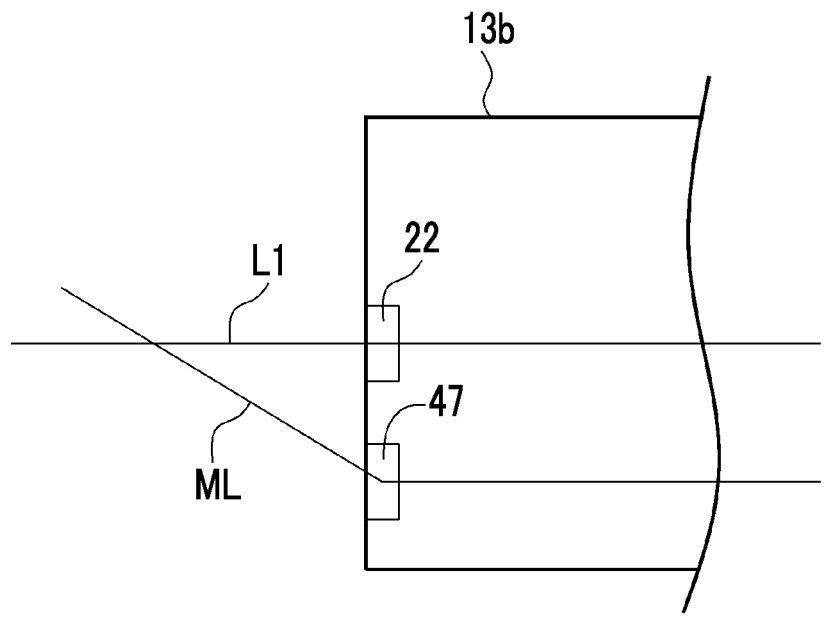

FIG. 12 is a diagram illustrating emission aspects of first illumination light and of auxiliary measurement light.

Figure 13:
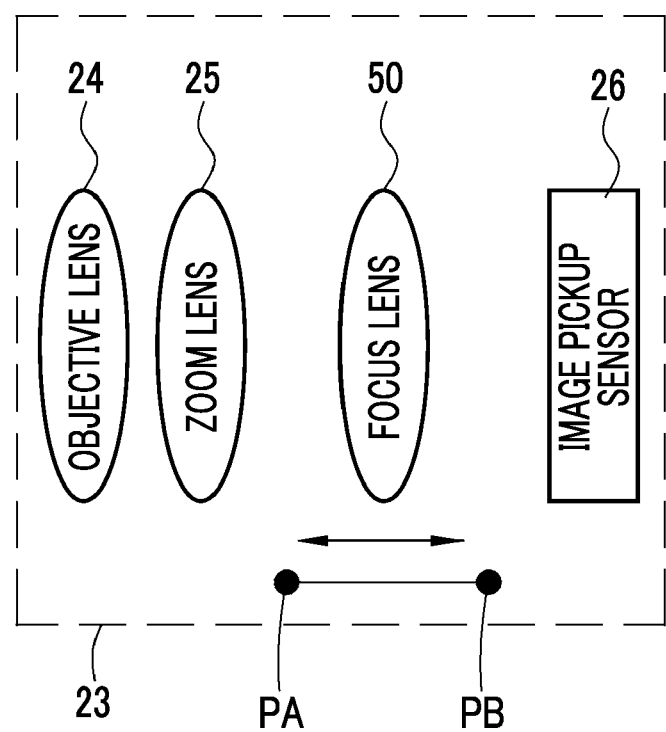

FIG. 13 is a block diagram showing an illumination optical system having a focus lens.

(A) of FIG. 14 is a diagram illustrating focus control and image pickup control in a fixed focus mode, and (B) of FIG. 14 is a diagram illustrating focus control and image pickup control in a variable focus mode.

DESCRIPTION OF THE PREFERRED EMBODIMENTS

Figure 1:
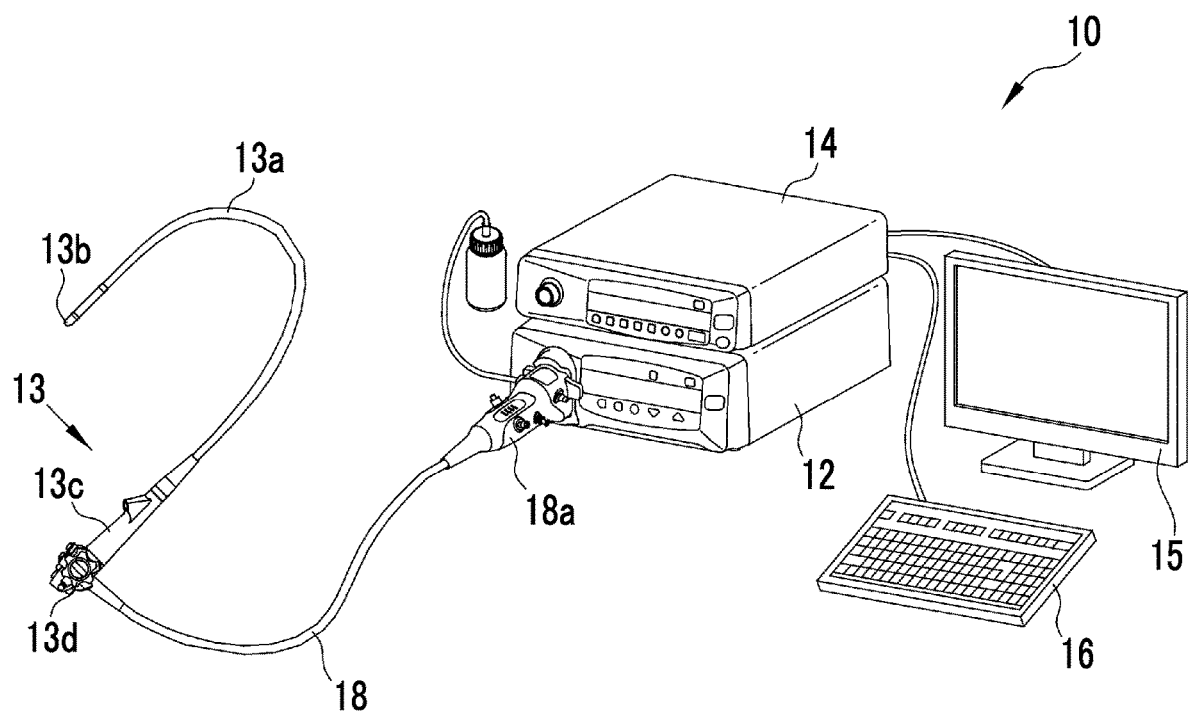
FIG. 1 is an external view of an endoscope system.

As shown in FIG. 1, an endoscope system 10 comprises a light source device 12, an endoscope 13, a processor device 14, a display 15, and a user interface 16. The endoscope 13 is optically and electrically connected to the light source device 12 and is electrically connected to the processor device 14.

The light source device 12 generates illumination light and supplies the generated illumination light to the endoscope 13. The endoscope 13 comprises an insertion part 13a that is a tubular member extending in one direction and that is inserted into a subject to be examined, a distal end portion 13b that is a distal end of the insertion part 13a, that emits illumination light, and that picks up an image of an object to be observed, an operation part 13c that is provided at a proximal end portion of the insertion part 13a and that is used to perform various operations, and an angle knob 13d provided adjacent to the operation part 13c. The distal end portion 13b can be directed in a desired direction through a rotational movement operation of the angle knob 13d.

The endoscope 13 has a universal cord 18 provided at a position different from a position where the insertion part 13a is provided. The universal cord 18 comprises a connector 18a that attachably and detachably connects the endoscope 13 to the light source device 12 and to the processor device 14.

The processor device 14 performs various types of processing on the basis of the image of the object to be observed picked up by the endoscope 13. The image subjected to various types of processing is displayed on the display 15. The user interface 16 inputs various types of information to the processor device 14 in response to an operation input from a user. It is preferable that the user interface 16 comprises a mouse, a microphone, a tablet, a foot switch, a touch pen, and the like in addition to a keyboard, which is shown.

The endoscope system 10 has two modes, that is, a mono-light emission mode and a multi-light emission mode, as a light emission mode of the illumination light. In the mono-light emission mode, first illumination light is continuously emitted, and a first illumination light image based on the first illumination light is displayed on the display 15. In the multi-light emission mode, the first illumination light and second illumination light having light emission spectra different from each other are emitted in accordance with a specific light emission pattern, and the first illumination light image based on the first illumination light and a second illumination light image based on the second illumination light are displayed on the display 15 in accordance with a specific display aspect. The above two modes can be switched by a user's operation to a mode selector switch (not shown) provided in the operation part 13c.

Figure 2:
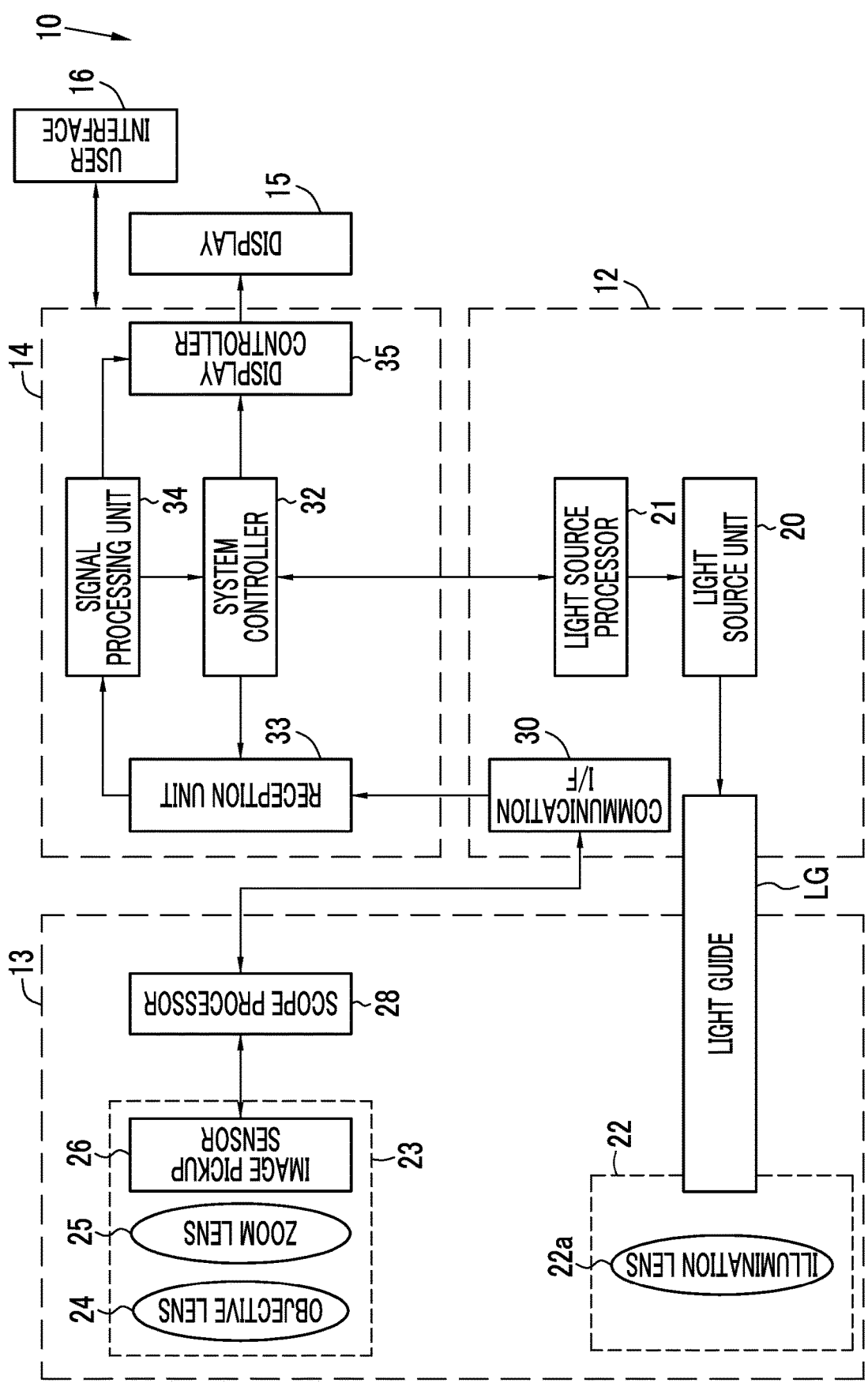
FIG. 2 is a block diagram showing a function of the endoscope system.

As shown in FIG. 2, the light source device 12 comprises a light source unit 20 and a light source processor 21. The light source unit 20 generates illumination light for illuminating the subject. For the light source unit 20, for example, a white light source that emits white light, or a plurality of light sources including a white light source and a light source that emits light of other colors (for example, a blue light source that emits blue light) are used as the light source of the illumination light. The light source processor 21 controls the light source unit 20 on the basis of an instruction from the processor device 14.

The illumination light emitted from the light source unit 20 is incident on a light guide LG. The light guide LG is provided inside the universal cord 18. The light from the light guide LG is emitted from the distal end portion 13b of the endoscope. Specifically, the subject is irradiated with the illumination light from an illumination lens 22a provided in an illumination optical system 22 of the distal end portion 13b.

An image pickup optical system 23 for picking up the image of the object to be observed is provided at the distal end portion 13b of the endoscope. The image pickup optical system 23 has an objective lens 24, a zoom lens 25, and an image pickup sensor 26. Reflected light from the object to be observed is incident on the image pickup sensor 26 via the objective lens 24 and the zoom lens 25. With this, a reflected image of the object to be observed is formed on the image pickup sensor 26.

The zoom lens 25 has an optical zoom function of enlarging or reducing the subject as a zoom function by moving between a telephoto end and a wide end. The optical zoom function can be switched between ON and OFF by a zoom operation portion (not shown) provided in the operation part 13c of the endoscope.

The image pickup sensor 26 is a color image pickup sensor, and picks up the reflected image of the subject to be examined and outputs an image signal. It is preferable that the image pickup sensor 26 is a charge coupled device (CCD) image pickup sensor, a complementary metal-oxide semiconductor (CMOS) image pickup sensor, or the like. The image pickup sensor 26 used in the present invention is a color image pickup sensor for obtaining a red image, a green image, and a blue image of three colors, that is, red (R), green (G), and blue (B). The red image is an image output from a red pixel provided with a red color filter in the image pickup sensor 26. The green image is an image output from a green pixel provided with a green color filter in the image pickup sensor 26. The blue image is an image output from a blue pixel provided with a blue color filter in the image pickup sensor 26.

The image signal output from the image pickup sensor 26 is transmitted to a scope processor 28. The scope processor 28 is provided with a correlated double sampling/auto gain control (CDS/AGC) circuit that performs correlated double sampling (CDS) or auto gain control (AGC) on the image signal that is an analog signal, an analog/digital (A/D) converter that converts the analog image signal into a digital image signal, or the like. The image signal output from the scope processor 28 is input to the processor device 14 via a communication interface (I/F) 30 of the light source device 12.

In the processor device 14, a program related to various types of processing, control, or the like is incorporated in a program storage memory (not shown). A system controller 32 configured by a system processor provided in the processor device 14 operates the program incorporated in the program storage memory, thereby realizing the functions of a reception unit 33, which is connected to the communication interface (I/F) 30 of the light source device 12, a signal processing unit 34, and a display controller 35.

The reception unit 33 receives the image signal transmitted from the communication I/F 30 and transmits the image signal to the signal processing unit 34. The signal processing unit 34 has an internal memory that temporarily stores the image signal received from the reception unit 33, and processes an image signal group, which is a set of image signals stored in the memory, to generate a subject image. The display controller 35 displays the generated subject image on the display 15.

Figure 3:
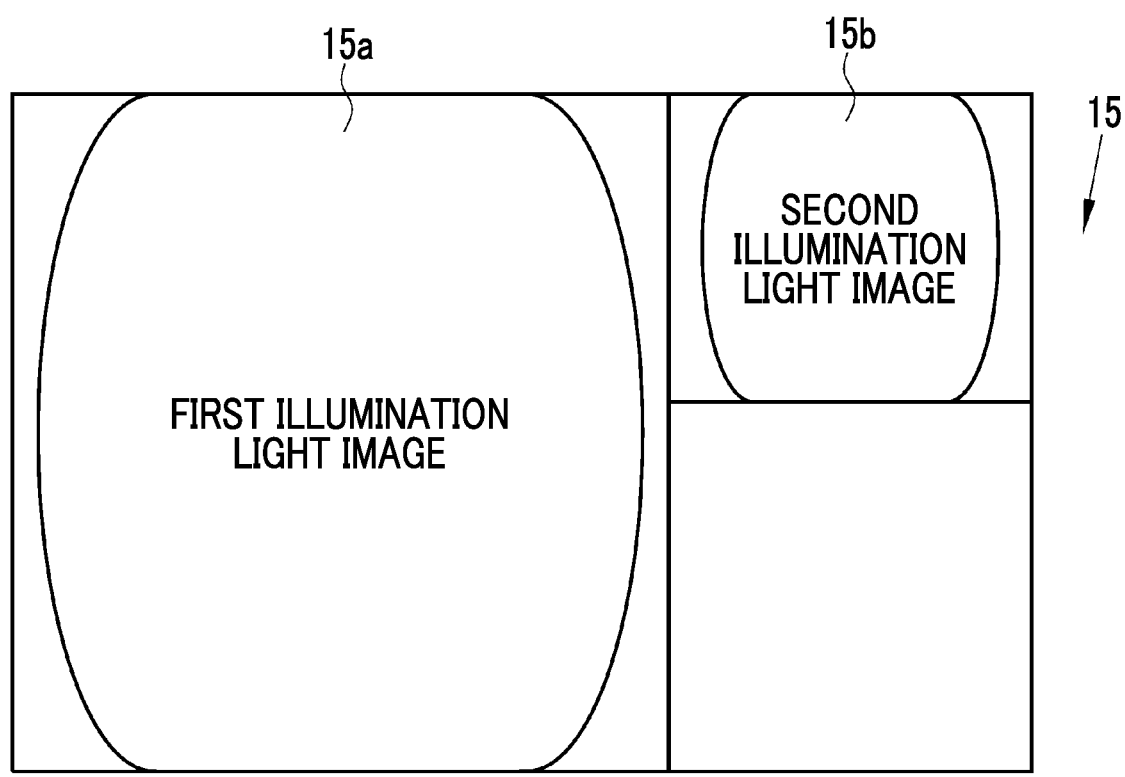
FIG. 3 is an image diagram showing a display aspect of a multi-light emission mode.

Specifically, in the mono-light emission mode, the first illumination light image is displayed on the entire display 15. In the multi-light emission mode, as shown in FIG. 3, the first illumination light image is displayed on a main screen 15a of the display 15, and the second illumination light image is displayed on a sub-screen 15b of the display 15. A display area of the sub-screen 15b is smaller than that of the main screen 15a.

Figure 4:
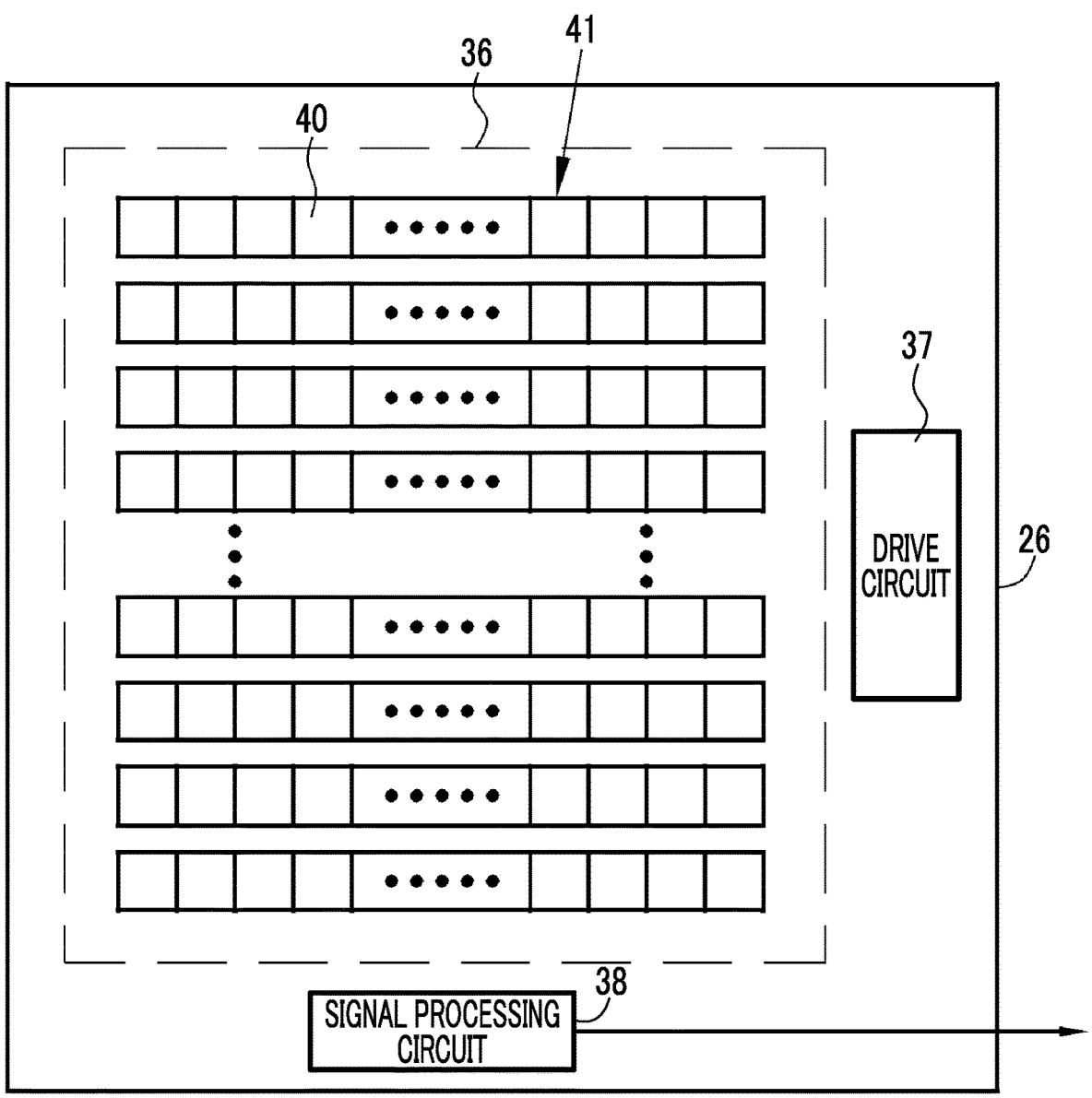
FIG. 4 is a diagram illustrating an image pickup sensor.

Details of the image pickup sensor 26 will be described below. As shown in FIG. 4, the image pickup sensor 26 comprises an image pickup surface 36, a drive circuit 37, and a signal processing circuit 38. On the image pickup surface 36, a plurality of pixel rows 41 consisting of a plurality of pixels 40 arranged in a row direction X are arranged in a column direction Y orthogonal to the row direction X. The drive circuit 37 independently drives each pixel row 41 on the basis of a drive control signal from the scope processor 28, and resets each pixel 40 provided in the pixel row 41 (discharges electric charges accumulated in a photoelectric conversion element). In addition, the image signal corresponding to the electric charges accumulated in the photoelectric conversion element of each pixel 40 is read out.

In the present embodiment, the image pickup sensor 26 uses a rolling shutter type drive. The rolling shutter type drive includes a rolling reset drive and a rolling readout drive. The rolling reset drive is a drive in which processing of resetting each pixel 40 of the pixel row 41 and starting the exposure of each pixel 40 is sequentially performed while changing the pixel row 41. The rolling readout drive is a drive in which processing of reading out a signal from each pixel 40 of the exposed pixel row 41 and ending the exposure of the pixel row 41 is sequentially performed while changing the pixel row 41. As for the image pickup sensor 26, a global shutter type drive may be used.

The light emission control and the image pickup control in the mono-light emission mode and in the multi-light emission mode will be described. The mono-light emission mode and the multi-light emission mode are switched by a mode switching operation using the user interface 16. As shown in (A) of FIG. 5, in the mono-light emission mode, first illumination light L1 is continuously emitted, and a rolling readout drive RD is performed in accordance with each emission of the first illumination light L1. In the mono-light emission mode, a light emission period Px of the first illumination light L1 and a signal readout period Rx of the rolling readout drive RD have the same length, and the light emission period Px and the signal readout period Rx overlap each other. Further, a frame period FLx (Px+Rx) in the mono-light emission mode is preferably, for example, 1/60 seconds.

On the other hand, in the multi-light emission mode, light is emitted by switching between the first illumination light L1 and a second illumination light L2 having light emission spectra different from each other in accordance with a specific light emission pattern. In (B) of FIG. 5, as the specific light emission pattern, the first illumination light L1 is emitted for two frames and then the second illumination light L2 is emitted for one frame. In the multi-light emission mode, in order to avoid color mixing due to light emitted by switching between the first illumination light and the second illumination light having different light emission spectra, a light emission period and a signal readout period of each illumination light are set so as not to overlap each other.

For this reason, the rolling readout drive RD is not performed during a period in which the first illumination light is emitted in a light emission period Py1. After the light emission period Py1 of the first illumination light is completed, a rolling readout drive based on the emission of the first illumination light L1 is performed during a signal readout period Ry1. Similarly, the rolling readout drive RD is not performed during a period in which the second illumination light is emitted in a light emission period Py2. After the light emission period Py2 of the second illumination light is completed, a rolling readout drive based on the emission of the second illumination light is performed during a signal readout period Ry2.

In the multi-light emission mode, the light emission period Py1 and the signal readout period Ry1 of the first illumination light L1 have the same length, and the light emission period Py2 and the signal readout period Ry2 of the second illumination light L2 have the same length. In addition, a frame period FLy (Py1+Ry1 or Py2+Ry2) in the multi-light emission mode is preferably, for example, ¹⁄₄₅ seconds. In a case where the cases of the multi-light emission mode and of the mono-light emission mode are compared with each other, the light emission periods Py1 and Py2 in the multi-light emission mode are each a high-speed light emission period (for example, ¹⁄₉₀ seconds) shorter than the light emission period Px in the mono-light emission mode. In addition, the signal readout periods Ry1 and Ry2 in the multi-light emission mode are each a high-speed readout period shorter than the signal readout period Rx in the mono-light emission mode. On the other hand, the frame period FLy in the multi-light emission mode is longer than the light emission period FLx in the mono-light emission mode (for example, ¹⁄₄₅ seconds) because the light emission period and the signal readout period do not overlap each other.

As described above, in the switching between the mono-light emission mode and the multi-light emission mode, the light emission control including the change of the light emission period is changed, and the image pickup control including the change of the signal readout period is changed. The endoscope system 10 according to the embodiment of the present invention is configured to solve a problem caused by the changes of the light emission control and of the image pickup control attendant upon switching the light emission mode.

In the present embodiment, in a case where, in the endoscope system 10, synchronization signals generated through image pickup performed by the endoscope 13 are transmitted to the light source device 12 and to the processor device 14 and the abnormality detection function is performed on the basis of the synchronization signals, the light emission control and the image pickup control are changed without disabling the abnormality detection function, through the switching of the light emission mode and the like. In order to realize the above, as shown in FIG. 6, the scope processor 28 of the endoscope 13 is provided with a scope controller 28a and a scope logic circuit 28b. In addition, the processor device 14 is provided with a histogram generation unit 45. Further, the light source processor 21 of the light source device 12 is provided with a synchronization signal generation unit 21a and a light source controller 21b.

In a case where the loss of the synchronization signal is recognized by the abnormality detection function in each processing unit or each controller of the light source device 12 and of the processor device 14, it is possible to detect that an abnormality on an upstream side of each processing unit or each controller has occurred. Further, it is preferable that the scope controller 28a, the system controller 32, or the light source controller 21b is configured by a central processing unit (CPU). It is preferable that the scope logic circuit 28b or the synchronization signal generation unit 21a is configured by a field programmable gate array (FPGA).

The control of the light source device 12 and of the processor device 14 during execution of the mono-light emission mode or of the multi-light emission mode will be described below. The frame signal generated by the image pickup sensor 26 of the endoscope 13 is transmitted to the light source device 12 and to the processor device 14 by the scope controller 28a. In addition, the scope controller 28a generates a synchronization signal used for various types of control each time the frame signal is generated. The generated synchronization signal is also transmitted to the light source device 12 and the processor device 14.

In the processor device 14, the signal processing unit 34 receives the frame signal and performs various types of signal processing on the basis of the received frame signal. The display controller 35 performs display on the display 15 on the basis of the frame signal subjected to various types of signal processing. In addition, the signal processing unit 34 receives the synchronization signal and performs control related to various processing parameters on the basis of the received synchronization signal. For example, an update timing of an image processing parameter of a matrix coefficient, such as color tone or structure enhancement, is controlled.

In addition, the histogram generation unit 45 receives the frame signal and the synchronization signal. The histogram generation unit 45 generates histogram information indicating a frequency of a pixel value of the frame signal on the basis of the received frame signal. The histogram information is used for light amount control of the light source device 12. The histogram generation unit 45 transmits the synchronization signal and the histogram information to the system controller 32. The system controller 32 calculates a target light amount as light amount control information on the basis of the histogram information. The calculated target light amount is transmitted to the light source controller 21b in accordance with a transmission timing based on the synchronization signal.

In the light source device 12, the synchronization signal generation unit 21a generates a synchronization signal used at a time at which light emission control is performed, on the basis of the synchronization signal from the endoscope 13. The light source controller 21b controls the light emission of the light source unit 20 such that the light emission amount is the target light amount transmitted from the processor device 14 in accordance with the light emission timing based on the synchronization signal generated by the synchronization signal generation unit 21a.

The control of the light source device 12 and of the processor device 14 in a case of switching between the mono-light emission mode and the multi-light emission mode will be described below. As shown in FIG. 7, during the execution of the mono-light emission mode, a frame signal FSgx output from the image pickup sensor 26 is transmitted to the light source device 12 and to the processor device 14 together with the synchronization signal via the scope logic circuit 28b. Then, in a case where a switching operation from the mono-light emission mode to the multi-light emission mode is performed by the user interface 16, the system controller 32 makes a sensor switching request for changing the image pickup drive method of the image pickup sensor 26 to the scope controller 28a. In FIG. 7, it is preferable that the light source device 12 and the processor device 14 are also controlled in the same manner for the switching from the multi-light emission mode to the mono-light emission mode. In addition, the change of the image pickup drive method includes a change of the signal readout period and the like, in addition to a change of the frame period (a frame rate, and the like).

The scope controller 28a performs a switching start setting for setting the start of the change of the image pickup drive method of the image pickup sensor 26 with respect to the scope logic circuit 28b, in response to the sensor switching request. The scope logic circuit 28b stops transmitting the frame signal FSgx to the light source device 12 and to the processor device 14 in response to the switching start setting. The image pickup sensor 26 changes the image pickup drive method of the mono-light emission mode to the image pickup drive method of the multi-light emission mode, through the switching start setting. Specifically, the frame period FLx is changed to the frame period FLy, and the signal readout period is changed from Rx to Ry1 and Ry2 for the rolling readout drive RD. After a certain time from the switching start setting, the scope controller 28a performs a switching completion setting for setting the completion of the change of the image pickup drive method of the image pickup sensor 26 with respect to the scope logic circuit 28b.

The scope logic circuit 28b generates a dummy signal DSg instead of the frame signal FSgx after a certain time from the switching start setting. The dummy signal is a signal different from the frame signal and is a signal artificially generated by the scope logic circuit 28b. The dummy signal DSg is transmitted to the light source device 12 and to the processor device 14 together with the synchronization signal. In addition, the scope logic circuit 28b stops the generation of the dummy signal DSg in response to the transmission of a frame signal FSgy from the image pickup sensor 26 after a certain time from the switching completion setting. After the generation of the dummy signal Dsg is stopped, the scope logic circuit 28b transmits the frame signal FSgy to the light source device 12 and to the processor device 14. The dummy signal may be generated and output by a processor logic circuit (not shown) provided in the processor device 14 instead of the scope logic circuit 28b.

As described above, the dummy signal DSg is transmitted to the light source device 12 and to the processor device 14 together with the synchronization signal, similarly to the frame signals FSgx and FSgy. Therefore, since the dummy signal DSg is transmitted to the light source device 12 and to the processor device 14 together with the synchronization signal instead of the frame signal even in a situation in which the frame signal is not output when the image pickup drive method of the image pickup sensor 26 is changed, there is no need to disable the abnormality detection function in the light source device 12 and in the processor device 14.

As shown in FIG. 8, it is preferable to assign a dummy signal identifier DSgk to the dummy signal DSg. In the light source device 12 and the processor device 14, it is possible to identify the following three types of signals S1 to S3 for signals from the endoscope 13 by analyzing header information on the signals from the endoscope 13.

S1: Frame signal before the switching of the image pickup drive method (without dummy signal identifier DSgk)

S2: Dummy signal during the switching of the image pickup drive method (with dummy signal identifier DSgk)

S3: Frame signal after the switching of the image pickup drive method (without dummy signal identifier DSgk)

In the light source device 12 and the processor device 14, it is preferable to stop updating a video displayed on the display 15, at a time at which the dummy signal is identified. In addition, after the video update is stopped, the image processing parameter to be used after the image pickup drive method is changed is set. For example, in a case of switching from the mono-light emission mode to the multi-light emission mode, the image processing parameter used in the multi-light emission mode is set. It is preferable that the image processing parameter includes a matrix coefficient, such as color tone or structure enhancement.

In addition, at the time at which the dummy signal is identified, it is preferable to temporarily switch a light source control algorithm to a light source control algorithm during dummy signal identification so as not to calculate the target light amount on the basis of the dummy signal. Specifically, in a case where the histogram calculated for the target light amount is a histogram generated on the basis of the dummy signal, the system controller 32 does not use the histogram for the calculation of the target light amount. In this case, the histogram generation unit 45 generates a histogram (light source control information used for calculating the target light amount) on the basis of the frame signal immediately before the dummy signal is identified, and the system controller 32 calculates the target light amount on the basis of the generated histogram. As a result, it is possible to prevent the system controller 32 from calculating the target light amount with the histogram generated on the basis of the dummy signal.

In addition, at the time at which the frame signal is identified after the dummy signal is identified, the system controller 32 executes the light source control algorithm on the basis of a frame signal obtained after the frame signal is identified. With this, the execution of the light source control algorithm during dummy signal identification is stopped. Specifically, the target light amount corresponding to the light emission mode after the change of the image pickup drive method is calculated. The light source controller 21b performs light source control corresponding to the light emission mode after the change of the image pickup drive method, on the basis of the calculated target light amount.

For example, in a case of switching to the mono-light emission mode, the first illumination light is continuously emitted on the basis of the target light amount corresponding to the first illumination light. On the other hand, in a case of switching to the multi-light emission mode, light is emitted by switching between the first illumination light and the second illumination light in accordance with a specific light emission pattern on the basis of the target light amounts corresponding to the first and second illumination lights. Then, the display controller 35 resumes updating the video on the display 15 on the basis of the frame signal obtained after the frame signal is identified.

The dummy signal DSg may include a dummy identification image with which identification can be made as the dummy signal by the light source device 12 and the processor device 14, instead of the dummy signal identifier DSgk. For example, as shown in FIG. 9, it is preferable that the dummy signal DSg includes an artificially generated mosaic-like dummy identification image.

Next, a series of flows for changing the image pickup drive method of the image pickup sensor will be described with reference to the flowchart shown in FIG. 10. The scope logic circuit 28b outputs the frame signal and the synchronization signal to the processor device 14 unless the sensor switching request for changing the image pickup drive method is made to the scope controller 28a. Then, in a case where the sensor switching request is made to the scope controller 28a, the scope controller 28a performs, with respect to the scope logic circuit 28b, the switching start setting for setting the start of the change of the image pickup drive method of the image pickup sensor 26 in response to the sensor switching request. The image pickup sensor 26 changes the image pickup drive method of the mono-light emission mode to the image pickup drive method of the multi-light emission mode, through the switching start setting.

In addition, the scope logic circuit 28b outputs the dummy signal and the synchronization signal to the processor device 14 after a certain time from the switching start setting. The scope logic circuit 28b continues to output the dummy signal and the synchronization signal to the processor device 14 until the scope controller 28a performs the switching completion setting for setting the completion of the change of the image pickup drive method. Then, in a case where the switching completion setting is performed from the scope controller 28a, the output of the dummy signal is stopped, and the frame signal and the synchronization signal after the change of the image pickup drive method are output to the processor device 14.

In the above-described embodiment, although the present invention (the generation of the dummy signal or the like is performed when the image pickup drive method is changed) is applied to a case of switching between the mono-light emission mode and the multi-light emission mode, the present invention can also be applied to a case where the image pickup drive method is changed in another embodiment in which an image pickup sensor is used. For example, as shown in FIG. 11, the present invention can also be applied to a case of switching between the light emission control and the image pickup control of the mono-light emission mode shown in (A) and the light emission control and the image pickup control of a multi-color intermittent light emission mode shown in (B).

In the multi-color intermittent light emission mode, in addition to emitting the first illumination light, third illumination light is intermittently emitted at the same time as the first illumination light. Specifically, as for the first illumination light, emission in the light emission period Py and non-emission in the signal readout period Ry are repeatedly performed. The third illumination light is emitted at the same time as the first illumination light in the light emission period Py at intervals of one frame, and is not emitted at the same time as the first illumination light in the signal readout period Ry.

In the multi-color intermittent light emission mode, the light emission period Py and the signal readout period Ry have the same length. In addition, the frame period FLy (Py+Ry) of the multi-color intermittent light emission mode is preferably, for example, 1/45 seconds. In a case where the cases of the multi-color intermittent light emission mode and of the mono-light emission mode are compared with each other, the light emission period Py in the multi-color intermittent light emission mode is a high-speed light emission period (for example, 1/90 seconds) shorter than the light emission period Px in the mono-light emission mode. In addition, the signal readout period Ry in the multi-color intermittent light emission mode is a high-speed readout period shorter than the signal readout period Rx in the mono-light emission mode. On the other hand, the frame period FLy in the multi-color intermittent light emission mode is longer than the light emission period FLx in the mono-light emission mode (for example, 1/45 seconds) in order not to overlap the light emission period and the signal readout period with each other.

As the third illumination light, for example, there is auxiliary measurement light ML for measuring the size of a subject. As shown in FIG. 12, it is preferable that the auxiliary measurement light ML is emitted from an auxiliary light emitting unit 47 for the auxiliary measurement light, which is different from the illumination optical system 22 of the distal end portion 13b of the endoscope. The auxiliary light emitting unit 47 is provided such that an optical axis of the first illumination light L1 and an optical axis of the auxiliary measurement light ML intersect with each other, whereby the auxiliary measurement light ML moves in an up-down direction on a screen according to the distance to the object to be observed. In the processor device 14, the movement of the auxiliary measurement light in the up-down direction is recognized, whereby the distance to the object to be observed can be recognized, and a size measurement scale corresponding to the observation distance can be displayed on the display 15.

Further, in the endoscope 13, as shown in FIG. 13, in a case where the image pickup optical system 23 comprises a focus lens 50, it is preferable to provide a variable focus mode in which a position of the focus lens 50 periodically varies between a focus position PA and a focus position PB, in addition to a fixed focus mode in which the position of the focus lens 50 is fixed. Then, as shown in FIG. 14, the present invention can be applied to a case of switching between the fixed focus mode and the variable focus mode. The switching between the fixed focus mode and the variable focus mode is performed by the user interface 16.

As shown in (A) of FIG. 14, in the fixed focus mode, the position of the focus lens 50 is fixed at a specific position between the focus position PA and the focus position PB. In the fixed focus mode, the rolling readout drive RD is performed in a signal readout period Rp. The signal readout period Rp is preferably, for example, 1/60 seconds. On the other hand, as shown in (B) of FIG. 14, in the variable focus mode, the position of the focus lens 50 periodically varies between the focus position PA and the focus position PB. In the variable focus mode, the rolling readout drive RD is performed in a signal readout period Rq shorter than the signal readout period Rp. The signal readout period Rq is made shorter than the signal readout period Rp, whereby it is possible to solve a problem attendant upon the positional variation of the focus lens 50 (such as blurring). The signal readout period Rq is preferably, for example, 1/45 seconds. A frame period FLp (which is the same as the signal readout period Rp) represents the frame period of the fixed focus mode, and a frame period FLq (which is the same as the signal readout period Rq) represents the frame period of the variable focus mode.

In FIG. 14, it is assumed that the fixed focus mode and the variable focus mode are executed in the mono-light emission mode, but the fixed focus mode and the variable focus mode may also be executed in the multi-light emission mode. In addition, the present invention may be applied to a case of switching between the fixed focus mode and the variable focus mode in various image pickup devices (for example, a digital camera) other than the endoscope system 10.

In the above-described embodiment, the hardware structure of the processing unit that executes various types of processing is various processors as shown below. Examples of the various processors include a central processing unit (CPU) which is a general-purpose processor that executes software (programs) to function as various processing units, a graphical processing unit (GPU), a programmable logic device (PLD) which is a processor having a changeable circuit configuration after manufacture, such as a field programmable gate array (FPGA), and a dedicated electrical circuit which is a processor having a dedicated circuit configuration designed to execute various types of processing.

One processing unit may be composed of one of the various processors or may be composed of a combination of two or more processors of the same type or different types (for example, a combination of a plurality of FPGAs, a combination of a CPU and an FPGA, or a combination of a CPU and a GPU). Alternatively, a plurality of processing units may be composed of one processor. A first example in which a plurality of processing units are composed of one processor is an aspect in which one or more CPUs and software are combined to constitute one processor and the processor functions as a plurality of processing units, as typified by a computer, such as a client or a server. A second example is an aspect in which a processor that realizes functions of an entire system including a plurality of processing units with one integrated circuit (IC) chip is used, as typified by a system on chip (SoC) or the like. As described above, various processing units are composed of one or more of the above-described various processors, as the hardware structure.

Furthermore, as the hardware structure of the various processors, more specifically, an electrical circuit (circuitry) in which circuit elements, such as semiconductor elements, are combined is used. Further, the hardware structure of the storage unit is a storage device, such as a hard disc drive (HDD) or a solid state drive (SSD).

EXPLANATION OF REFERENCES

10: endoscope system
12: light source device
13: endoscope
13a: insertion part
13b: distal end portion
13c: operation part
13d: angle knob
14: processor device
15: display
15a: main screen
15b: sub-screen
16: user interface
18: universal cord
18a: connector
20: light source unit
21: light source processor
21a: synchronization signal generation unit
21b: light source controller
22: illumination optical system
22a: illumination lens
23: image pickup optical system
24: objective lens
25: zoom lens
26: image pickup sensor
28: scope processor
28a: scope controller
28b: scope logic circuit
30: communication I/F
32: system controller
33: reception unit
34: signal processing unit
35: display controller
36: image pickup surface
37: drive circuit
38: signal processing circuit
40: pixel
41: pixel row
45: histogram generation unit
47: auxiliary light emitting unit
50: focus lens
DSg: dummy signal
DSgk: dummy signal identifier
FLx, FLy: frame period
L1: first illumination light
L2: second illumination light
LG: light guide
Px, Py1, Py2, Py: light emission period
Rx, Ry, Ry1, Ry2: signal readout period
RD: rolling readout drive
X: row direction
Y: column direction

What is claimed is:

1. An endoscope system comprising:
an endoscope having an image pickup sensor and a scope processor; and
a processor device having a system processor,
wherein the system processor is configured to make a sensor switching request for changing an image pickup drive method of the image pickup sensor to the scope processor, and
any of the scope processor or the system processor is configured to output, to the processor device, a synchronization signal and a frame signal which is output from the image pickup sensor through image pickup of an object to be observed, in a case where the image pickup drive method is not changed, and to output, to the processor device, a synchronization signal and a dummy signal which is a signal different from the frame signal and which is artificially generated, in a case where the image pickup drive method is changed in response to the sensor switching request.

2. The endoscope system according to claim 1,
wherein a dummy signal identifier is assigned to the dummy signal.

3. The endoscope system according to claim 2,
wherein any of the scope processor or the system processor is configured to:
identify the frame signal before switching of the image pickup drive method or as the frame signal after the switching of the image pickup drive method, in a case where there is no dummy signal identifier; and
identify the dummy signal during the switching of the image pickup drive method, in a case where there is the dummy signal identifier.

4. The endoscope system according to claim 3,
wherein the system processor is configured to stop updating a video displayed on a display, at a time at which the dummy signal is identified.

5. The endoscope system according to claim 3,
wherein the system processor is configured to set an image processing parameter to be used after changing the image pickup drive method, at a time at which the dummy signal is identified.

6. The endoscope system according to claim 3,
wherein the system processor is configured to temporarily switch a light source control algorithm to a light source control algorithm during dummy signal identification, at a time at which the dummy signal is identified.

7. The endoscope system according to claim 6,
wherein the algorithm during dummy signal identification includes generating light source control information used for calculating a target light amount, on the basis of a frame signal immediately before the dummy signal is identified.

8. The endoscope system according to claim 3,
wherein the system processor is configured to execute a light source control algorithm on the basis of a frame signal obtained after the frame signal is identified, at a time at which the frame signal is identified after the dummy signal is identified.

9. The endoscope system according to claim 1,
wherein the system processor is configured to resume updating a video on a display, on the basis of a frame signal obtained after the frame signal is identified, at a time at which the frame signal is identified after the dummy signal is identified.

10. The endoscope system according to claim 1,
wherein the dummy signal includes a dummy identification image.

11. The endoscope system according to claim 1,
wherein the system processor is configured to perform an abnormality detection function on the basis of the synchronization signal.

12. An operation method of an endoscope system that includes an endoscope, which has an image pickup sensor and a scope processor, and a processor device, which has a system processor, the operation method comprising:
a step of causing the system processor to make a sensor switching request for changing an image pickup drive method of the image pickup sensor to the scope processor; and
a step of causing any of the scope processor or the system processor to output, to the processor device, a synchronization signal and a frame signal which is output from the image pickup sensor through image pickup of an object to be observed, in a case where the image pickup drive method is not changed, and to output, to the processor device, a synchronization signal and a dummy signal which is a signal different from the frame signal and which is artificially generated, in a case where the image pickup drive method is changed in response to the sensor switching request.

* * * * *